US011750673B2

(12) United States Patent
Teng et al.

(10) Patent No.: US 11,750,673 B2
(45) Date of Patent: *Sep. 5, 2023

(54) USER INTERFACE CONTENT STATE SYNCHRONIZATION ACROSS DEVICES

(71) Applicant: Spring Design Inc., Fremont, CA (US)

(72) Inventors: Albert Teng, Cupertino, CA (US); Jack Yuan, Cupertino, CA (US); Xiao Bin, Pudong District (CN); Richard Li, Shanghai (CN)

(73) Assignee: SPRING DESIGN, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,368

(22) Filed: Sep. 16, 2021

(65) Prior Publication Data

US 2022/0321629 A1    Oct. 6, 2022

Related U.S. Application Data

(63) Continuation of application No. 16/826,637, filed on Mar. 23, 2020, now Pat. No. 11,134,113, which is a
(Continued)

(51) Int. Cl.
*H04L 65/612* (2022.01)
*H04L 67/10* (2022.01)
(Continued)

(52) U.S. Cl.
CPC ............ *H04L 65/612* (2022.05); *G06F 16/27* (2019.01); *H04L 67/04* (2013.01); *H04L 67/10* (2013.01);
(Continued)

(58) Field of Classification Search
CPC ....... H04L 65/612; H04L 67/01; H04L 67/04; H04L 67/10; H04L 67/1095; H04L 67/131; H04L 67/51; H04L 67/55; G06F 16/27

See application file for complete search history.

(56) References Cited

U.S. PATENT DOCUMENTS 7,603,683 B2    10/2009  Reto
7,716,376 B1     5/2010  Price et al.
(Continued)

FOREIGN PATENT DOCUMENTS

CN    101088250 A    12/2007
CN    101981558 A     2/2011

OTHER PUBLICATIONS

PCT International Search Report and Written Opinion, PCT Application No. PCT/CN2012/001033, dated Nov. 15, 2012, 14 pages.
(Continued)

*Primary Examiner* — Jeong S Park
(74) *Attorney, Agent, or Firm* — FENWICK & WEST LLP

(57) ABSTRACT

Methods for synchronizing a client application user interface (UI) state of content of a client application on a client device corresponding with a host application on a host device are presented, the method including: receiving an update on the host application; transmitting a request for remote notification to the client device to synchronize the UI state of content of the client application responsive to receiving the event; displaying a notification corresponding with the request for remote notification on the client device indicating content is available to the client device; selecting the notification; launching the client application on the client device; transmitting a synchronizing request by the client device to the host device; enabling a synchronization mode of the host application; determining a host application UI
(Continued)

state; transmitting content data associated with the UI state of the host application to the client device; and displaying the client application UI state based on the content data from the host device.

16 Claims, 12 Drawing Sheets

Related U.S. Application Data continuation of application No. 16/386,073, filed on Apr. 16, 2019, now Pat. No. 10,616,295, which is a continuation of application No. 15/045,248, filed on Feb. 17, 2016, now Pat. No. 10,298,642, which is a continuation of application No. 13/957,338, filed on Aug. 1, 2013, now Pat. No. 9,438,697, which is a continuation of application No. PCT/CN2012/001033, filed on Aug. 1, 2012.

(60) Provisional application No. 61/682,893, filed on Aug. 14, 2012, provisional application No. 61/680,642, filed on Aug. 7, 2012, provisional application No. 61/670,561, filed on Jul. 11, 2012, provisional application No. 61/589,159, filed on Jan. 20, 2012, provisional application No. 61/576,287, filed on Dec. 15, 2011, provisional application No. 61/568,399, filed on Dec. 8, 2011, provisional application No. 61/513,870, filed on Aug. 1, 2011.

(51) Int. Cl.
*H04L 67/1095* (2022.01)
*G06F 16/27* (2019.01)
*H04L 67/51* (2022.01)
*H04L 67/55* (2022.01)
*H04L 67/131* (2022.01)
*H04L 67/04* (2022.01)
*H04L 67/01* (2022.01)

(52) U.S. Cl.
CPC ........ *H04L 67/1095* (2013.01); *H04L 67/131* (2022.05); *H04L 67/51* (2022.05); *H04L 67/55* (2022.05); *H04L 67/01* (2022.05)

(56) References Cited

U.S. PATENT DOCUMENTS

| | | | |
|---|---|---|---|
| 8,751,690 B2 | 6/2014 | Shah | |
| 8,943,538 B2 | 1/2015 | Jacoby et al. | |
| 9,083,600 B1 | 7/2015 | Smith et al. | |
| 9,143,543 B2 | 9/2015 | Falvo | |
| 9,438,697 B2* | 9/2016 | Teng | G06F 3/1423 |
| 10,298,642 B2* | 5/2019 | Teng | H04L 67/51 |
| 10,616,295 B2* | 4/2020 | Teng | H04L 67/131 |
| 11,134,113 B2* | 9/2021 | Teng | H04L 67/55 |
| 2005/0210101 A1 | 9/2005 | Janik | |
| 2008/0256468 A1 | 10/2008 | Peters et al. | |
| 2009/0088197 A1* | 4/2009 | Stewart | H04M 1/72412 455/550.1 |
| 2010/0115023 A1* | 5/2010 | Peled | H04L 67/01 715/760 |
| 2013/0290872 A1 | 10/2013 | Hong et al. | |
| 2013/0318158 A1* | 11/2013 | Teng | G06F 3/1423 709/203 |
| 2013/0332846 A1* | 12/2013 | Freedman | G06F 16/27 715/745 |
| 2014/0244721 A1* | 8/2014 | Taine | H04L 67/02 709/203 |
| 2015/0046953 A1 | 2/2015 | Davidson et al. | |
| 2015/0205851 A1* | 7/2015 | Freedman | H04L 67/1095 707/634 |

OTHER PUBLICATIONS

United States Office Action, U.S. Appl. No. 16/386,073, filed Sep. 4, 2019, 11 pages.
United States Office Action, U.S. Appl. No. 15/045,248, dated Nov. 13, 2017, 18 pages.
United States Office Action, U.S. Appl. No. 16/826,637, dated Nov. 9, 2020, 11 pages.

* cited by examiner

USER INTERFACE CONTENT STATE SYNCHRONIZATION ACROSS DEVICES

BACKGROUND

Smart phones, such as ANDROID operating system based phones, are becoming as computationally powerful as traditional laptop and desktop computers. Smart phones offer specialized functionality in form factors small enough to carry in small spaces such as a pocket or a carrying bag. For example, smart phones allow users to perform various functions on their phones such as browse the Internet, play video games, read digital books, view multimedia content (e.g., video, audio, and images), view documents, etc. However, because smart phones are designed to be small, the display screens of the smart phones are limited in size thereby hindering the readability and usability of the smart phones. This limitation will only become worse over time as technology advances will allow for smaller smart phones to be developed. It may, therefore, be desirable to provide a method that allows a smart phone to synchronize the state of content displayed on the smart phone with another device that includes a larger display screen to enhance readability and usability of the functionality provided by the smart phone on the other device.

SUMMARY

Methods for synchronizing a client application user interface (UI) state of content of a client application on a client device corresponding with a host application on a host device are presented, the method including: receiving an update on the host application; transmitting a request for remote notification to the client device to synchronize the UI state of content of the client application responsive to receiving the event; displaying a notification corresponding with the request for remote notification on the client device indicating content is available to the client device; selecting the notification; launching the client application on the client device; transmitting a synchronizing request by the client device to the host device; enabling a synchronization mode of the host application; determining a host application UI state; transmitting content data associated with the UI state of the host application to the client device; and displaying the client application UI state based on the content data from the host device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures depict various embodiments described herein for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
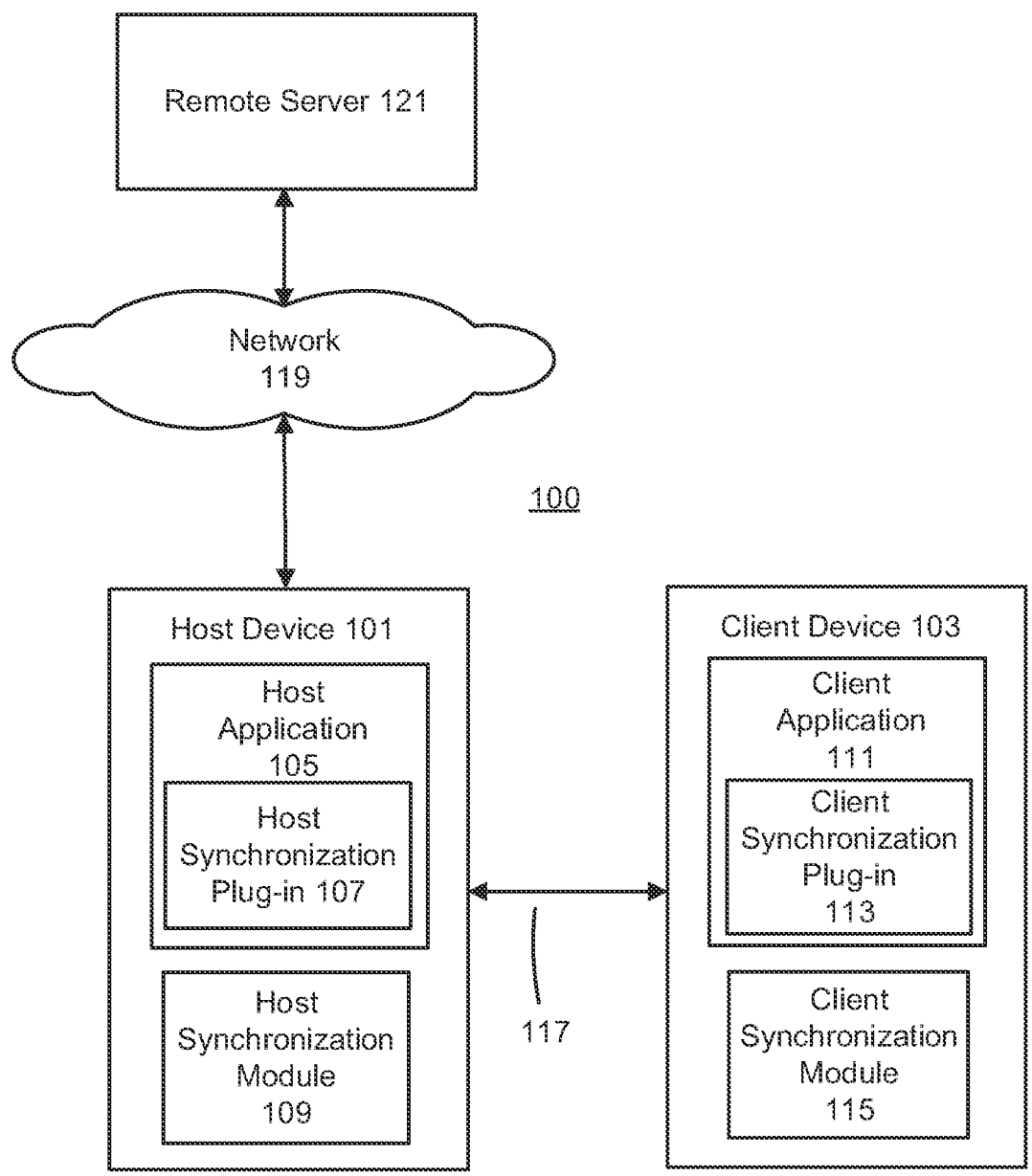
FIG. 1 illustrates an architecture for user interface (UI) state synchronization across devices according to one embodiment.

FIG. 1 illustrates an operating environment 100 for user interface (UI) state synchronization between a host device 101 and a client device 103 of a user. In one embodiment, the operating environment 100 includes the host device 101, a client device 103, a communication channel 117 that allows for communication between the host device 101 and the client device, a network 119, and a remote server 121. Generally, both the host device 101 and the client device 103 have display screens (e.g., light emitting diode (LED) screens), but the client device 103 has a larger display screen compared to the display screen of the host device 101. For example, in the context of description herein, the host device 100 is representative of a smart phone and the client device 103 is representative of a tablet computer (hereafter referred to as a "tablet"). However, the concepts described herein are applicable to any other pairs of computing devices that include display screens such as desktop computers, laptop computers, television displays controlled by a set-top box, global positioning system (GPS) devices, electronic paper display (EPD) readers such as an e INK display, a bi-stable display device, digital photo frame devices, etc.

In one embodiment, UI state synchronization between a host device 101 and a client device 103 of a user allows for content of a host application on the host device 101 which is representative of the current state of the UI of a host application to be synchronized for display by a corresponding client application on the client device 103. In one embodiment, the client device 103 may lack network connectivity to the network 119 (e.g., the Internet) that would otherwise allow the client device 103 to directly obtain content from a remote server 121 for viewing on the client device 103. In another embodiment, the user may want to access content stored on the host device 101 via the client device 103. For example, the client device 103 may lack the most recent version of the content that is stored on the local storage of the host device 101. The client device 103 may also lack functionality (e.g., a camera) that is available on the host device 101 and relies on the host device 101 for the functionality. By synchronizing the UI state of a host application on the host device 101 with a corresponding client application on a client device 103, the user may leverage the network connectivity of the host device 101 to the network 119 to obtain content from the remote server 121 that can be synchronized for display on the client device 103 or may leverage local content of the host device 101. In one embodiment, the remote server 121 may represent an email server, a web server, a media server, or any type of server that provides to content for viewing by users.

Furthermore, the user may leverage functionality available only on the host device 101 which may or may not rely on network connectivity to the network 119 to obtain content that may be synchronized for display on the client device 103. For example, the user may capture a photograph using a camera on the host device 101. The user may then synchronize a photo application displaying a captured image on the host device 101 with a corresponding photo application on the client device 103 to display the captured image on the client device 103.

By synchronizing the UI state of a host application with a client application on the client device, the user's viewing experience is enhanced because the larger display screen of the client device 103 may be utilized by the user to view content originally displayed on the host device 101. Furthermore, the user may interact with the synchronized content directly on the client device 103 while the UI state of the host device 101 is synchronized with the client device 103 because the corresponding client application is installed on the client device 103. The client application on the client device 103 can process user inputs received at the client device 103 such as zooming, scrolling, or shrinking content, but relies upon the host application on the host device 101 to retrieve content that is unavailable at the client device 103. For example, the content may be unavailable at the client device 103 due to the lack of network connectivity or the content may be stored locally at the host device 101.

Figure 2:
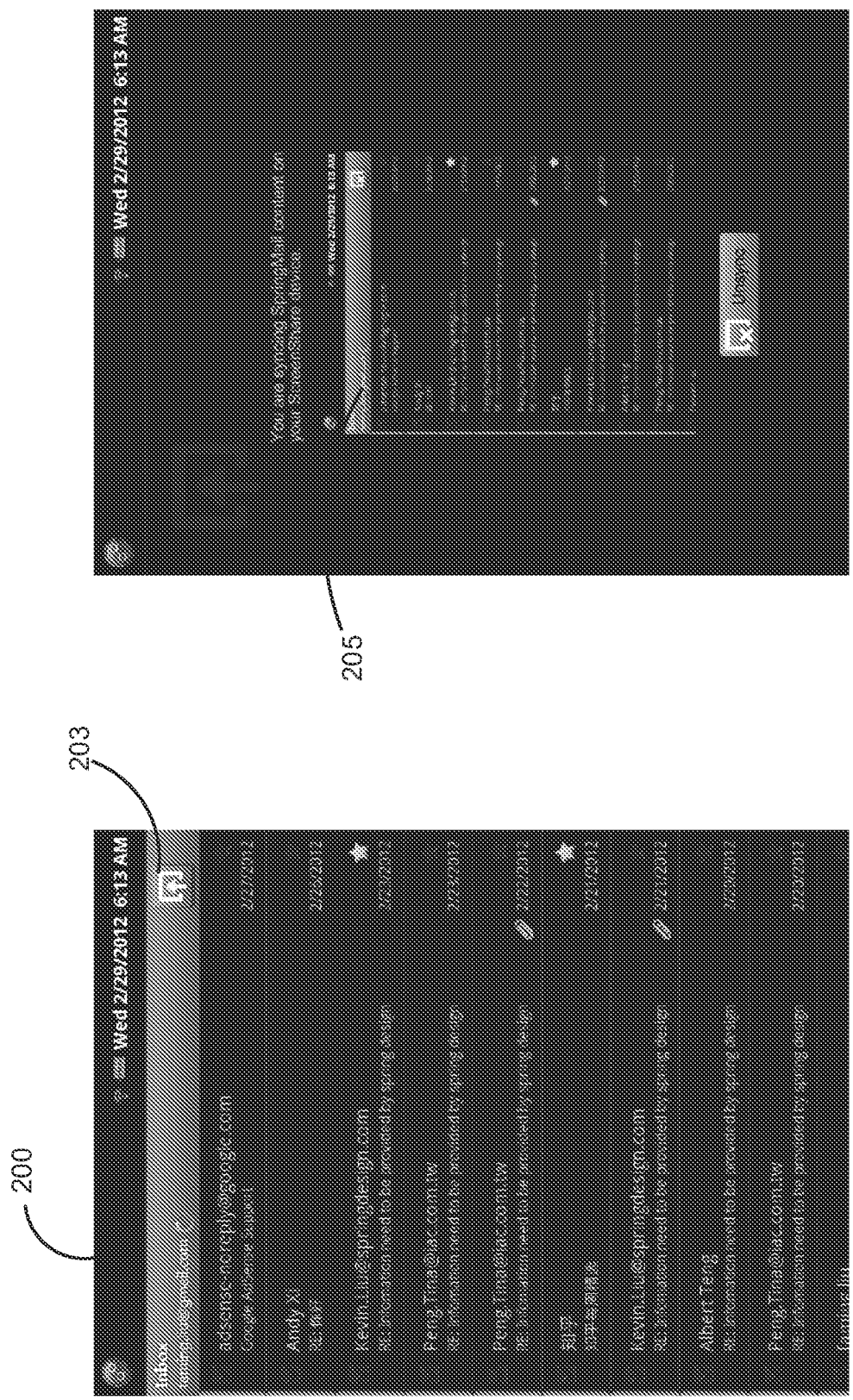
FIG. 2A and FIG. 2B illustrate UI states of a host email application on a host device which is synchronized with a corresponding client email application on a client device according to one embodiment.

FIG. 2 illustrates a UI 200 of content of an email application displayed on a host device 101 such as a smart phone according to one embodiment. The email application is enabled with UI state synchronization functionality as will be further described below. The UI 200 of the content of the host email application displayed on the host device 101 displays emails of the user retrieved from a remote email server via the network 119. Because of the limited size of the display screen of the host device 101 and/or the lack of network connectivity of the client device 103, the user may enable UI state synchronization with the user's client device 103 such as a tablet computer. In one embodiment, the user may enable UI state synchronization by providing an instruction to synchronize the UI state of the host email application on the host device 101 with a corresponding client email application on the client device 103. The instruction may include the user's selection of a synchronize user interface button displayed in the UI of the host email application on the host device 101.

For example, the UI 200 of the content of the host email application displayed on the host device 101 includes a synchronize button 203. If the user selects the synchronize button 203, the host device 101 synchronizes the state of the UI of the host email application on the host device 101 with a corresponding client email application on the client device 103. Once synchronized, the client email application displays the content (e.g., the emails) of the host application. That is, the client email application displays a UI state of content of the client email application that corresponds to the UI state of content of the host email application. In one embodiment, the content of the host email application may be replicated by the client email application. For example, the UI 200 of the host email application will be displayed by the corresponding client email application on the client device 103. Alternatively, the client email application on the client device 103 may display a UI state of the host email application that has been formatted for display by the client email application. For example, the emails may be visually arranged in a manner specific to the client email application but still provide the same content as the host email application.

Thus, the client device 103 is able to access content (e.g., emails) from the email server by synchronizing with the host device 101. The user may not only view emails via the client device 103, but may also interact with the emails directly on the client device 103 such as opening emails, replying to emails, etc. since the content data is received by the client device 103 which may be processed by the corresponding client email application. Accordingly, the user is not limited to merely viewing the current UI state of the host application on the client device 103.

Once the UI state of the host email application on the host device 101 is synchronized with a corresponding client email application on the client device 103, the host device 101 may coordinate with the client application to display an image (e.g., a bitmap image) of the UI state of the host email application when synchronization occurred. For example, in FIG. 2B, the host device 101 may coordinate with the client email application to display an image of the UI 205 of the host email application that corresponds to the data that was transmitted to the client device 103 upon synchronization.

Figure 3:
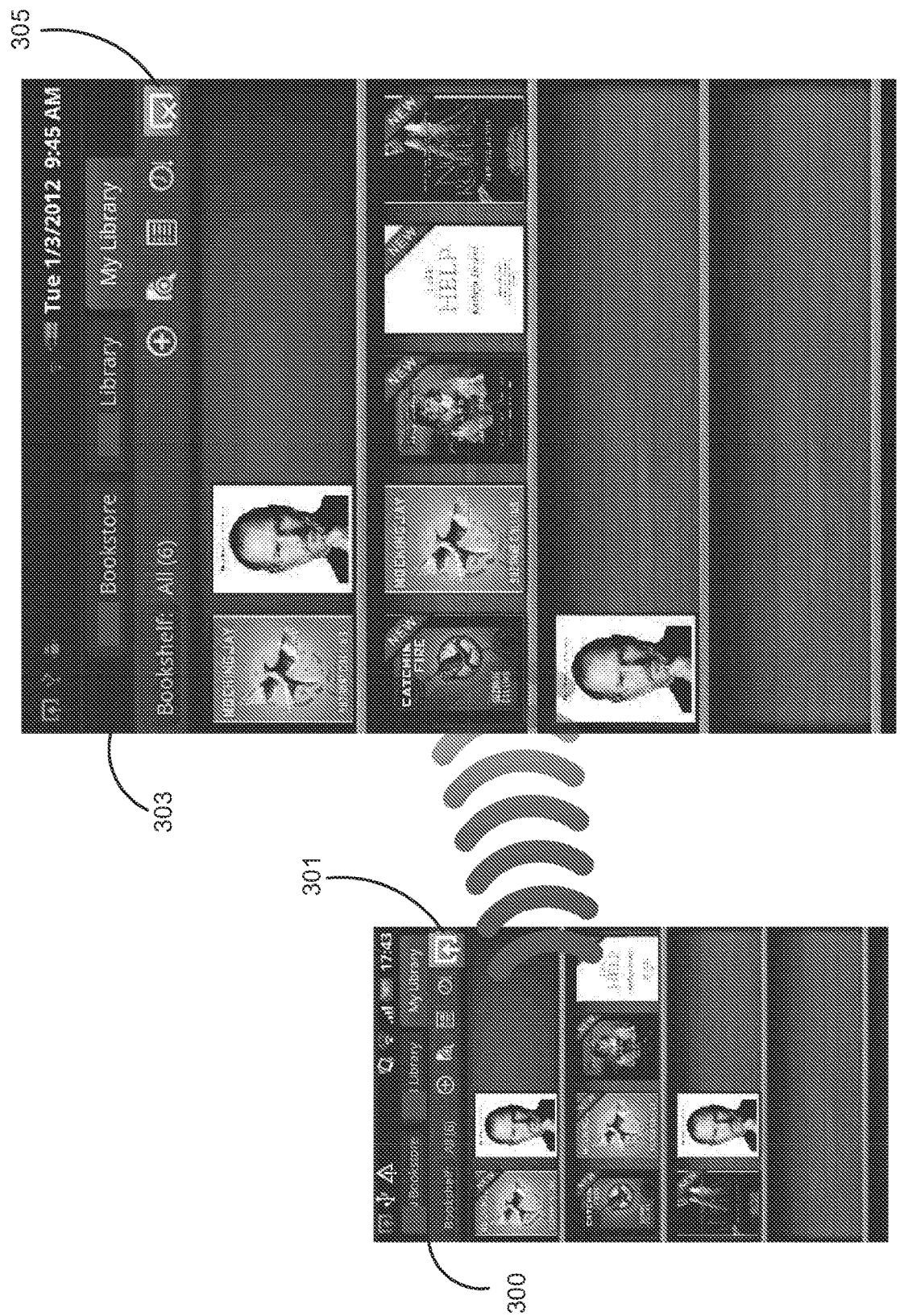
FIG. 3 illustrates a UI state of a host digital library application on a host device which is synchronized with a corresponding client digital library application on a client device according to one embodiment.

In another example of UI state synchronization, FIG. 3 illustrates a UI 300 of a host digital library application displayed on a host device 101 such as a smart phone. Because of the limited size of the display screen of the smart phone, the user may synchronize the current UI state of the host digital library application on the smart phone with a client device 103 such as a tablet computer to enhance the reading experience of a digital book. In one embodiment, the user may want to synchronize the UI state of the host digital library application smart phone with the tablet computer due to the tablet computer's lack of connectivity which prevents the user from accessing the digital book library from a remote digital library that stores the user's digital books directly from the tablet computer. Alternatively, the user may want to synchronize the UI state of the host digital library application on the smart phone with the tablet computer due to the tablet computer lacking a digital book(s) that is available on the smart phone.

If the user selects the synchronize button 301 on the smart phone, the smart phone transmits data corresponding to the UI 300 displayed on the smart phone to the tablet computer which launches a corresponding client digital book application on the tablet computer. The tablet computer then displays a UI 303 corresponding to the UI 300 displayed on the smart phone based on the received data corresponding to the UI 300 allowing the user to take advantage of the larger display screen of the tablet computer when reading a digital book. In the example of FIG. 3, the UI 303 displayed on the tablet computer is approximately identical to the UI 300 displayed on the smart phone. However, the UI displayed on the tablet computer may be distinct from the UI displayed on the smart phone while still conveying the same content displayed on the smart phone. Once synchronized the user may select a digital book from the UI 303 displayed on the client digital library application for reading. The client device 103 may receive encoded content (e.g., in PDF format of EPUB) corresponding to the selected digital book from the host application which retrieved the digital book from the remote digital library via network 119. Alternatively, the digital book may be stored locally at the host device 101 and the host device 101 transmits the digital book to the client device 103. The client application on the tablet computer can process the encoded content and display the decoded book user interface on the display screen of the tablet computer. Particularly, once the encoded book content is stored in the cache memory of the tablet computer, the client application can directly process user commands and update the UI of the tablet computer without relying on the smart phone to perform any processing. Processing commands at the tablet computer greatly improves the response time at the tablet computer when a user performs any interactions with respect to the client digital library application such as scrolling, searching, changing font size or changing reading related screen settings. The user may desynchronize the smart phone and tablet computer by selecting the desynchronize button 305 which would cause the UI state of the host digital book application on the smart phone to no longer be displayed on the tablet computer.

Figure 4:
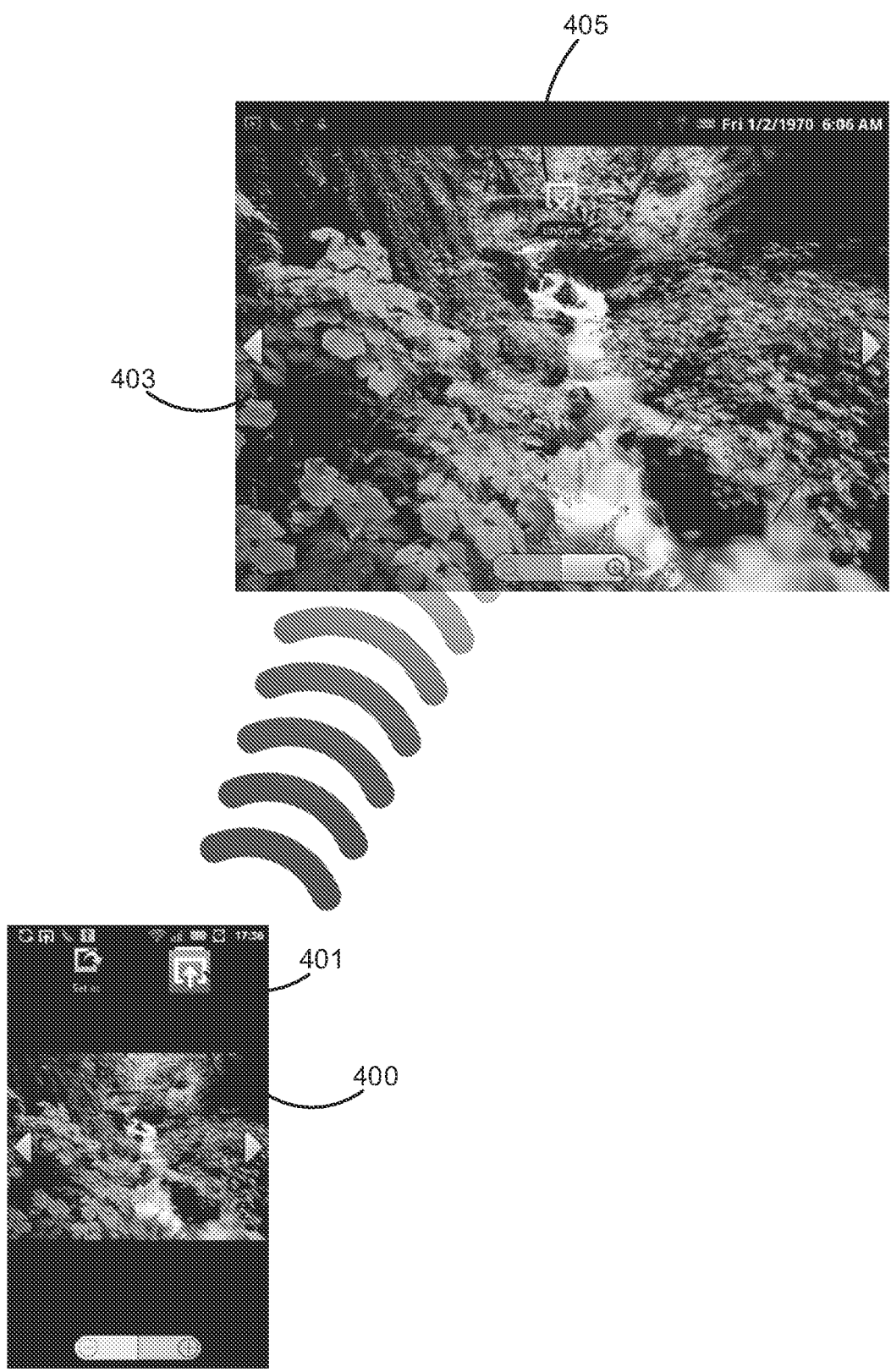
FIG. 4 illustrates a UI state of a host photo viewing application on a host device which is synchronized with a corresponding client photo viewing application on a client device according to one embodiment.

In yet another example of UI state synchronization, FIG. 4 illustrates a UI 400 of a photograph displayed on a host device 101 such as a smart phone. Because of the limited size of the display screen of the smart phone and the lack of a camera on a client device 103 such as a tablet computer, the user may synchronize the current UI state of a host photo application on the smart phone with a client photo application on the client device 103 to enhance the viewing experience of the photograph. Thus, the user may use the smart phone which includes a camera to capture the photograph illustrated in FIG. 4, but utilize the larger display screen of the tablet computer to view the captured photograph on the client device 103.

If the user selects the synchronize button 401, the smart phone executes a corresponding client photo application on the tablet computer and transmits content data corresponding to the UI 400 (e.g., a JPEG file) displayed on the smart phone to the tablet computer. The tablet computer processes the content data (e.g. the JPEG file) then displays a UI 403 including the photograph displayed on the smart phone. The photo application on the tablet computer can process user command inputs such as photo zooming, orientation change, and scrolling without relying on the smart phone to perform any processing related to the UI update. However, the client photo application may transmit a request to the host photo application on the smart phone to retrieve new photo data (e.g. another JPEG file) that is unavailable at the tablet computer. The user may desynchronize the smart phone and tablet computer by selecting the desynchronize button 405 which would cause the UI state of the smart phone to no longer be displayed on the tablet computer.

Figure 5:
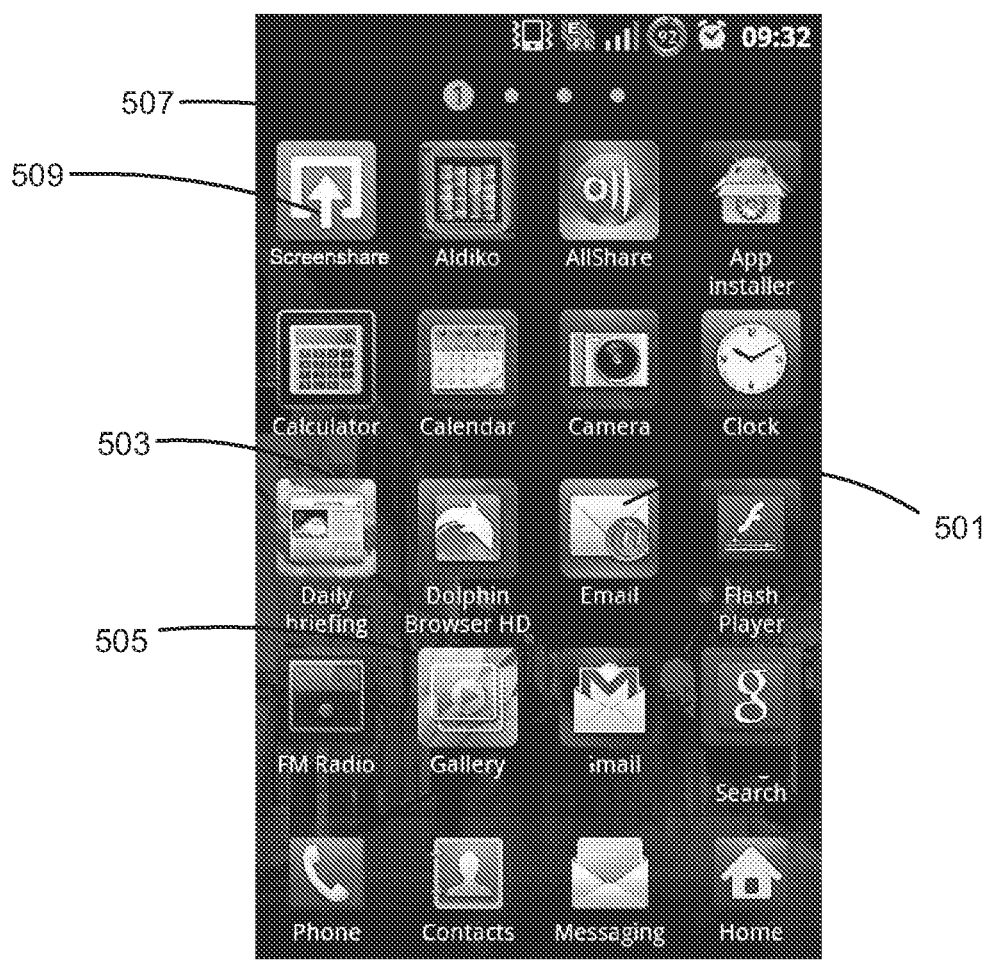
FIG. 5 illustrates a user interface of a host device illustrating an icon associated with the host synchronization module according to one embodiment.

Referring back to FIG. 1, the host device 101 comprises a host application 105. Although only a single host application 105 is shown in FIG. 1, any number of host applications may be installed on the host device 101. The host application 105 is representative of any application that may be installed on a computing device that performs a useful functionality for the user of the host device 101. For example, the host application 105 may represent an email application that allows the user of the host device 101 to access his or her emails stored on a remote email server. The host application 105 may also represent an electronic book application that includes a digital library of the user's electronic books stored on a remote digital library or locally at the host device 101 or may represent a photo album application that displays the user's digital photographs stored on the host device 101 or stored on a remote photo server. Furthermore, the host application 105 may represent a news paper application from which the user accesses news articles from a remote newspaper server. As shown in FIG. 5, a number of host applications are represented as icons on host device 101 such as an email application icon 501, a news paper application icon 503, a photo album application icon 505, and an electronic book application icon 507.

Referring back to FIG. 1, in one embodiment a host application 105 comprises a host synchronization plug-in 107. The host synchronization plug-in 107 enables the host application 105 with UI state synchronization capabilities provided by the host synchronization module 109. Thus, the host synchronization plug-in 107 functions as an interface for interaction between the host application 105 and the host synchronization module 109. In one embodiment, the host synchronization plug-in 107 communicates with the host synchronization module 109 using inter-process communication (IPC).

As shown in FIG. 1, the host device 101 comprises a host synchronization module 109. The host synchronization module 109 provides UI state synchronization capabilities to the host device 101 as will be described in further detail with respect to FIG. 6A.

In one embodiment, the client device 103 similarly comprises a client synchronization module 115 and a client application 111 including a client synchronization plug-in 113. The client synchronization module 115, client application 111, and the client synchronization plug-in 113 on the client device 103 perform similar functionality as their respective counterparts on the host device 101. Thus, the functionality of the client synchronization module 115, client application 111, and the client synchronization plug-in 113 on the client device 103 are omitted for ease of readability.

In one embodiment, the client application 111 and the host application 105 are different instances of the same application that is respectively stored on the client device 103 and the host device 101. For example, if a news application "Daily Briefing" is installed on the host device 101, another instance of the news application "Daily Briefing" may also be installed on the client device 103 to allow for UI state synchronization across the devices as will be further described below.

In one embodiment, the host device 101 and the client device 103 directly communicate with one another via a communication channel 117. The communication channel 117 may include a wireless protocol such as BLUETOOH, a WiFi network, or a WiFi hotspot. In one embodiment, the wireless protocol (e.g., BLUETOOTH) is used as the default communication channel 117 between the host device 101 and the client device 103 due to the power saving characteristics of the wireless protocol. The user of the host device 101 and the client device 103 may also select WiFi for the communication channel 117 between the host device 101 and the client device 103 for faster data connectivity at the expense of higher battery consumption of the devices.

In one embodiment, the host device 101 and the client device 103 automatically switches between WiFi and the wireless protocol (e.g., BLUETOOTH) based on the data transfer requirements of the host device 101 and the client device 103. For example, if there is a need for faster data connectivity, the host device 101 and the client device 103 may automatically transition from using the wireless protocol channel to the WiFi communication channel to transfer data between the host device 101 and the client device 103 without input from the user and without interruption of the UI state synchronization across the devices. In another example, if at least one of the host device 101 and/or the client device 103 is running low on battery, either device may switch from using WiFi communication channel to using the wireless protocol communication channel to save power.

Figure 6:
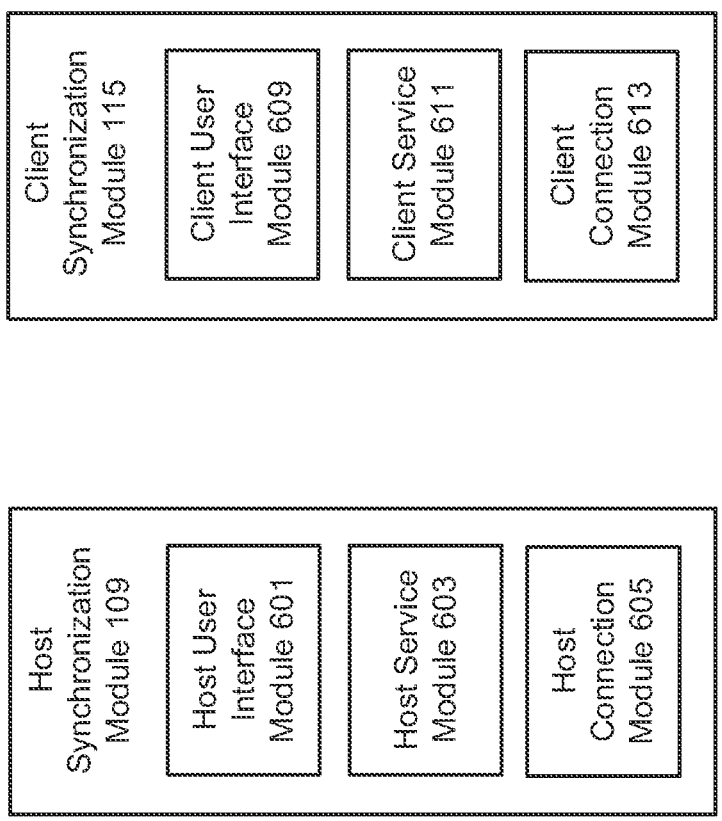
FIGS. 6A and 6B respectively illustrate detailed views of the host synchronization module and client synchronization module according to one embodiment.

Referring now to FIGS. 6A and 6B, detailed views of the host synchronization module 109 and the client synchronization module 115 are shown. In one embodiment, the host synchronization module 109 of the host device 101 comprises a host user interface module 601, a host service module 603, and a host connection module 605. The client synchronization module 115 of the client device 103 similarly comprises a client user interface module 609, a client service module 611, and a client connection module 613. The following descriptions of the various modules of the host synchronization module 109 are also applicable to the modules of the client synchronization module 607. Thus, the functionally of the modules of the client synchronization module 607 are omitted for ease of readability.

Figure 7:
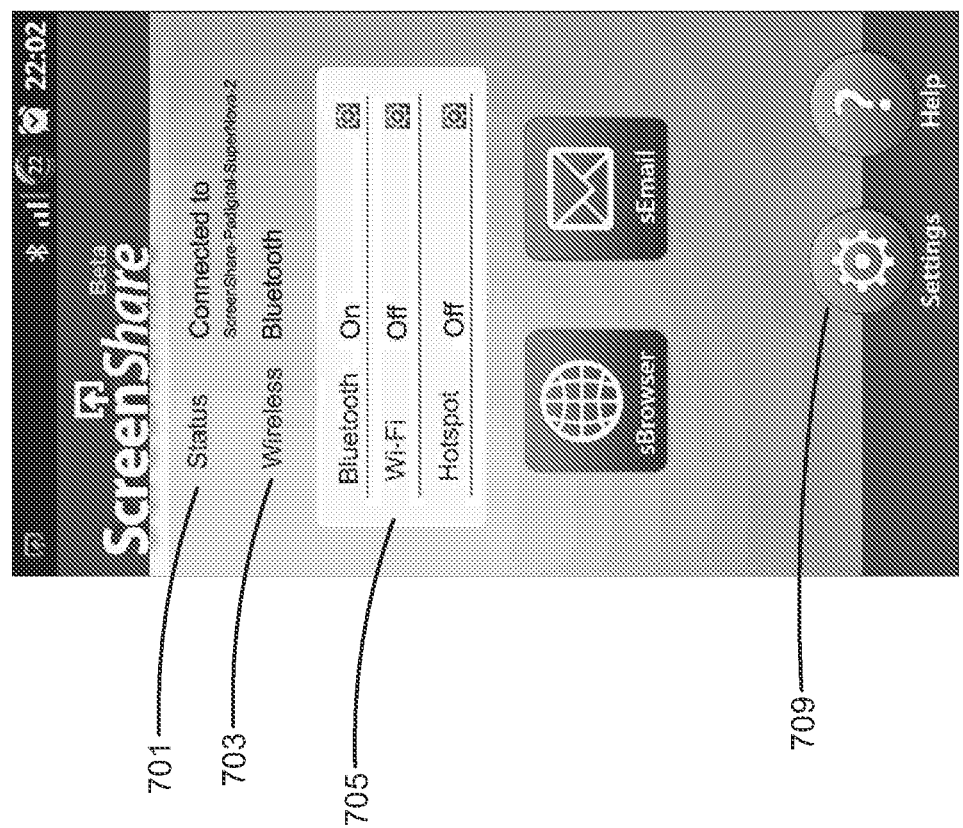
FIG. 7 illustrates a user interface of a home page associated with the host synchronization module according to one embodiment.

In one embodiment, the host user interface module 601 generates the user interfaces for a UI state synchronization application that is representative of the host synchronization module 109. For example, in FIG. 5, the host user interface module 601 generates an icon 509 for the UI state synchronization application associated with the host synchronization module 109 on the host device 101. If the user selects the icon 509, the host user interface module 601 generates a home screen UI 700 for the UI state synchronization application as shown in FIG. 7.

The home screen UI 700 provides an information summary of the UI state synchronization application. In one embodiment, the information summary includes the status 701 of any client devices 103 currently connected to the host device 101. The status may be "connected" indicating that the host device 101 and the client device 103 are connected or "not connected" indicating that the host device 101 and the client device 103 are not connected. In the example shown in FIG. 7, the host device 101 is currently connected to a client device named "ScreenShare-Padigital-Super-Nova-2."

Additionally, the information summary may describe the communication channel 117 being used by the host device 101 to connect with a client device 103 if the devices are connected. For example, in FIG. 7 the host device 101 is currently connected to the client device "ScreenShare-Padigital-SuperNova-2" via BLUETOOTH. The information summary may also provide an overview of the types of communication mechanisms that the host device 101 may use to connect to the network 119 and/or client device 103. In FIG. 7, the overview 705 of the types of communication mechanisms indicates that the host device 101 may connect to the network 119 and/or client device 103 using BLUETOOTH, WiFi, and/or WiFi hostspots.

In one embodiment, the information summary further describes the host applications 105 on the host device 101 that are enabled with UI state synchronization capabilities.

FIG. 7 illustrates that a browser application (e.g., sBrowser) and an email application (e.g., sEmail) are enabled with UI state synchronization capabilities provided by the host synchronization module 109. In one embodiment, the user may invoke the host applications 105 by clicking on the associated buttons displayed on the home screen UI 700. The information summary generated by the user interface module 601 further includes a settings button 709 that allows the user to modify configuration settings of the UI state synchronization application.

Figure 8:
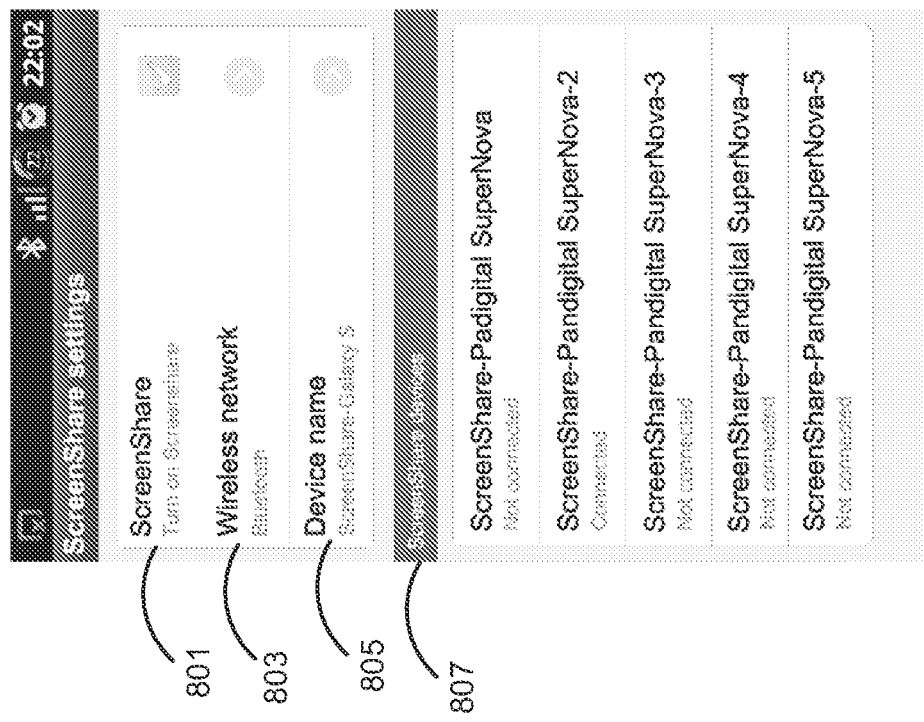
FIG. 8 illustrates a settings user interface associated with the host synchronization module according to one embodiment.

FIG. 8 illustrates a settings UI 800 generated by the host user interface module 601 for the UI state synchronization application on the host device 101 according to one embodiment. The settings UI 800 allows a user to globally enable or disable UI state synchronization capabilities across all host applications 105 on the host device 101 that include a host synchronization plug-in 107. In one embodiment, the user may enable or disable UI state synchronization capabilities by selecting the enable/disable setting 801. By enabling the UI state synchronization setting, the host synchronization plug-in 107 of a host application 105 is allowed to communicate with host synchronization module 109 to perform UI state synchronization with a corresponding client application 111 on a client device 103.

The user may also select the type of communication channel 117 to be used to connect to client devices 103 via the wireless network setting 803. By selecting the wireless network setting 803, the user may select BLUETOOH or WiFi to connect to a client device 103 in one embodiment. The user may also configure the device name for the host device using the device name setting 805. In the example shown in FIG. 8, the name of the host device 101 is "ScreenShare-Galaxy S." Lastly, the settings UI 800 provides a list 807 of client devices 103 of the user or other users which have been enabled with UI state synchronization capabilities which can connect with the host device 101 to perform UI state synchronization. In one embodiment, the list includes the names of the client devices 103 as well as their connection status with the host device 101. In FIG. 8, only the client device named "ScreenShare-Panidigital SuperNova-2" is currently connected with the host device 101.

Referring back to FIG. 6A, the host connection module 605 establishes a connection with the client device 103 via the communication channel 117 when UI state synchronization is requested by the user. The host connection module 605 may establish the connection according the configuration settings established by the user of the host device 101. For example, the host connection module 605 may identify the preferred type of communication channel (e.g., BLUETOOH or WiFi) of the user to connect the user's host device 101 and client device 103 from the configuration settings of the host device 101. Once the preferred type of communication channel 117 is identified, the host connection module 605 connects the host device 101 and the client device 103 via the preferred type of communication channel. In one embodiment, the host connection module 605 also switches between types of communication channels. The host connection module 605 may automatically switch the type of communication channel 117 used to connect the host device 101 and the client device 103 or upon user request or automatically, as will be further described below.

In one embodiment, the host service module 603 enables the host application 105 with UI state synchronization capabilities via the host synchronization plug-in 107. When a host application 105 is executed on the host device 101, the host application 105 provides to the user data that is local to the host device 101 and/or data retrieved from the remote server 121 via network 119. The user of the host device 101 may establish an application level connection between the host application 105 and a corresponding client application 111 on the client device 103 in order to synchronize the UI state of the host application 105 on the host device 101 with a client application 111 on the client device 103. Once synchronized, the data corresponding to the content (e.g., an email, a web page, a photograph) displayed by the host application on the host device 101 is sent to the client device 103 and is displayed by the client application of the client device 103. Note that the client device 103 does not merely display an image of the UI displayed on the host device 101. Rather, when displaying a UI state of the client application that corresponds to the UI state of the host application, the client application 111 processes the data corresponding to the content displayed by the host application and renders a UI state on the client device 103 based on the received data. For example, the client application 111 may receive HTML code representing a web page displayed by the host device 101 and may process the HTML code to display the web page on the client device 103. In one embodiment, the client application displays a UI state that is identical to the UI state of the host application based on the content data received from the host device 101. Alternatively, the client application displays a UI state distinct from the UI state of the host application. That is, the client application may display content data of the UI state of the host application that has been formatted for display on the client application. Thus, although the UI state of the client application may be visually distinct from the UI state of the host application, the content displayed by the client application is identical to the content displayed by the host application. Generally, the user often views content on the client device 103 (e.g., a tablet computer) and leaves the display screen of the host device 101 off. Thus, in one embodiment the UI state changes on the client device 103 are not updated to the host device 101 for actions such as scrolling, orientation change and zooming that does not change the content itself.

In one embodiment, the establishment of a connection between the host application 105 on the host device 101 and the corresponding client application 111 on the client device 103 via the communication channel 117 is performed when the user issues a command on the host device 101 to synchronize the UI state of the host application 105 with the client application 111 on the client device 103. In one embodiment, the host service module 603 receives the command from the host synchronization plug-in 107 of the host application 105 responsive to the user selecting a "sync" button provided on the UI of the host device 101. The sync button may be provided in a menu from within the host application 105 or from a menu of the host device 101.

Upon receipt of the command, the host service module 603 instructs the host connection module 605 to connect to the client connection module 613 of the client device 103 via the communication channel 117. Once the host device 101 and client device 103 are connected via the communication channel 117, the host device 101 instructs the client synchronization module 607 of the client device 103 to execute the client application 111 on the client device 103 that corresponds to the host application 105 executing on the host device 101 whose UI state will be synchronized with the client device 103.

Once the client application 111 is executed, the host service module 603 transmits content data corresponding to the current UI state of the host application 105 to the client synchronization module 607 on the client device 103 which communicates the data to the client application 111 via the client synchronization plug-in 113. For example, in an email application, the host service module 603 may transmit content data corresponding to the body of the emails displayed by the host email application to the client device 103 for rendering by a corresponding client email application. The data may or may not include the attachments of any of the emails. In another example of a host web browser application, the host service module 603 may transmit HTML code that represents a web page displayed on the host web browser application to the client device 103 for rendering by a corresponding client web browser application on the client device 103. By sending encoded data such as HTML code rather than the raw screen image representing the UI content state, the response time on the client device 103 can improve when the data is sent via the communication channel 117 with limited bandwidth. Typically, the client application 111 can itself render the HTML code much faster than receiving a UI content image directly from the host application 105.

Once synchronized, the client application 111 no longer provides data local to the client device 103. Rather, the client application 111 on the client device 103 displays a UI state of the client application 111 that corresponds to the current UI state of the host application 105 on the host device 101 based on the received content data. For example, the current content displayed on the host device 101 such as the UI state of an email application may be displayed by a corresponding client application 111 on the client device 103. However, because the client application 111 includes at least a subset of the functionality as the host application 105, the user may directly interact (e.g., provide commands) with the content of the UI displayed by the client application 111 without relying on the host application 105 perform any processing related to the UI update as long as the related host application UI data is cached at the client application 111. Thus, the user may perform actions with respect to the UI state displayed on the client application 111 such as opening emails, zooming in on content, scrolling through content, editing documents such as word files, images, video, opening new web pages, etc. In one embodiment, while the UI state of the host device 101 is synchronized with the client device 103, the display screen of the host device 101 is disabled (i.e., turned-off) to conserve power. Alternatively, the host device 101 may display an image that is representative of the UI state of the host application 105 that is synchronized with a client application 111 on the client device 103.

Application Registration

Prior to being able to synchronize the UI state across host applications and client applications, the host service module 603 identifies a host application(s) 105 on the host device 101 to enable with UI state synchronization capabilities. In one embodiment, the host service module 603 sends a request to each of a plurality of host applications 105 installed on the host device 101 to register with the host service module 603. Generally, the operating system of the host device 101 (and the client device 103) may provide functionality that allows the host service module 603 to request for host applications 105 to register with the host service module 603. For example, the ANDROID operating system may receive notifications from host applications 105 describing the type of requests that may be received by the host applications 105 such as requests for registration. When the host service module 603 issues such a request for registration, the ANDROID operating system dispatches the request to each host application 105. In response, the host service module 603 receives from each of the plurality of host applications 105 an identifier corresponding to the host application 105 such as a serial number associated with the host application 105. The host service module 603 may also receive additional information such as a name of the host application 105, the version of the host application 105, and function calls of the host application 105. The information received from the host application 105 is stored by the host service module 603 in the host device 101. In one embodiment, the host service module 603 stores a list of host applications that are registered with the host service module 603. As will be further described below, the list of host applications may be used to determine the existence of client applications 111 on the client device 103 that correspond to the host applications 105 included in the list of host applications.

In one embodiment, the host service module 603 may request for any existing host applications 105 on the host device 101 to register with the host service module 603 after the host synchronization module 109 is initially installed on the host device 101. After the host synchronization module 109 is installed on the host device 101, the host service module 603 requests any new host applications 105 that are installed on the host device 101 to register with the host service module 603. Alternatively, a newly installed host application 105 registers with the host service module 603 when the host application 105 is first executed.

Device Pairing

In one embodiment, the host service module 603 identifies client device(s) 103 for pairing with the host device 101. That is, the host device 101 identifies one or more other client devices 103 that have been enabled with UI state synchronization capabilities that may synchronize with the host device 101. In one embodiment, when a host device 101 is paired with a client device 103, the host device 101 and client device are associated with one another so that the pair of devices may automatically recognize each other in the future for UI state synchronization. The host device 101 may add an identifier of any paired client devices 103 to a list of client devices that may connect with the host device 101.

Figure 9:
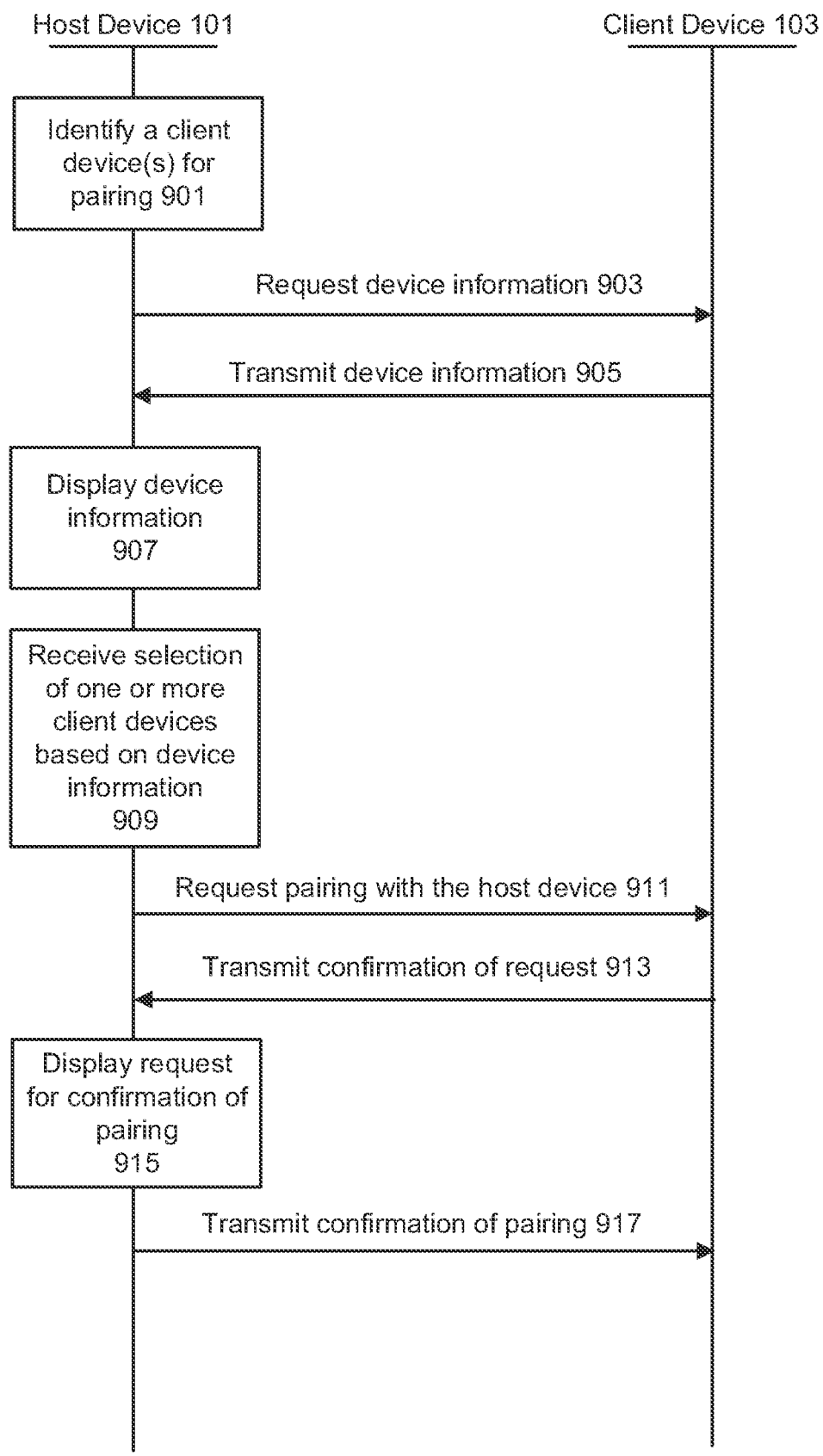
FIG. 9 illustrates an interaction diagram describing device pairing according to one embodiment.

Referring now to FIG. 9, there is shown one embodiment of an interaction diagram of the communication process between the host device 101 and the client device 103 to initially pair devices together for future UI state synchronization according to one embodiment. In one embodiment, the host service module 603 of the host device 101 identifies 901 client device(s) 103 for pairing with the host device 101. To identify a client device 103, the host service module 603 connects to a communication channel 117 (e.g., WiFi) via the host connection module 605. Once connected to the communication channel 117, the host service module 603 searches the communication channel 117 for one or more client devices 103 that are also connected to the communication channel 117. In one embodiment, the host service module 603 identifies only the client devices 103 that have been enabled with UI state synchronization capabilities through the installation of the client synchronization plug-in 113. For example, if a WiFi communication channel is established, the host service module 603 and the client service module 611 communicate through a specific port of a TCP socket. The host service module 603 may send a request to all client devices 103 connected to the WiFi communication channel and only the client devices 103 including the client service module 611 responds to the request and sends its device information to the host service module 603. Similarly, if a BLUETOOTH communication channel is established, the host service module 603 and the client service module 611 communicate through the BLUETOOTH socket. The host service module 603 may send a request to all client devices 103 that are connected to the BLUETOOTH communication channel and only the client devices 103 including the client service module 611 responds to the request and sends it device information to the host service module 603. Alternatively, the host service module 603 identifies any client devices 103 that are connected to the communication channel 117.

For each client device 103, the host service module 603 requests 903 device information from the client device 103. In one embodiment, the device information includes the name of the client device 103. The device information may further include a serial number of the client device 103, an IP address of the client device 103, a MAC address of the client device 103, a BLUETOOTH MAC address of the client device 103, and a software version of the client service module 611 on the client device 103. In response, the client service module 611 of each client device 103 transmits 905 the device information for the client device 103 to the host device 101. For example, a client device 103 may identify itself as "SuperNova" and another client device 103 may identify itself as "SuperNova2." Upon receipt of the device information from each client device 103, the host service module 603 displays 907 the device information to the user. Specifically, the host service module 603 instructs the host user interface module 601 to generate a notification for the user that indicates the name of each client device 103. The host service module 603 receives 909 a selection from the user of one or more client devices 103 indicated in the notification based on the device information received from the client devices 103. In one embodiment, the user selects only the devices which belong to the user. Alternatively, the user may select devices belonging to other users such as friends of the user. The user may select the devices belonging to his or her friends in order to synchronize content displayed on the user's host device 101 with the client devices 103 of the user's friends.

For each of the selected client devices 103, the host service module 603 requests 911 the client device 103 to pair with the host device 101. Once a host device 101 and a client device 103 are paired, the devices may synchronize in the future without the host device 101 having to re-identify the client device 103. Each client device 103 that receives the request transmits 913 a confirmation of the request to pair with the host device 101 and the host device 101 displays 915 to the user a request for confirmation of the pairing of the host device 101 and the client device 103. In one embodiment, the client device 103 also displays a request for the user to confirm the pairing of the devices.

Upon receipt of the confirmation from the user at the host device 101, the host device 101 transmits 917 a confirmation of the pairing of the host device 101 and the client device 101 to the client device 103. In one embodiment, the user must also submit a confirmation of the pairing at the client device 103 in addition to the confirmation submitted at the host device 101 to pair the devices. The host service module 603 then adds an identifier of the paired client device 103 to a list of client devices accessible to the host device for UI state synchronization.

Application Pairing

To complete the capability of UI state synchronization of a host application 105 on host device 101 with a client device 103, the host service module 106 identifies a client application 111 on a paired client device 103 that corresponds to the host application 105. The host service module 106 pairs the host application 105 and the identified client application 111. In one embodiment, pairing the host application 105 and client application 111 comprises the host service module 603 associating the host application 105 with the client application 111. By pairing the applications, the host service module 603 can automatically instruct the client device 103 to execute the corresponding client application 111 when a request for UI state synchronization of the host application 105 is received.

Figure 10:
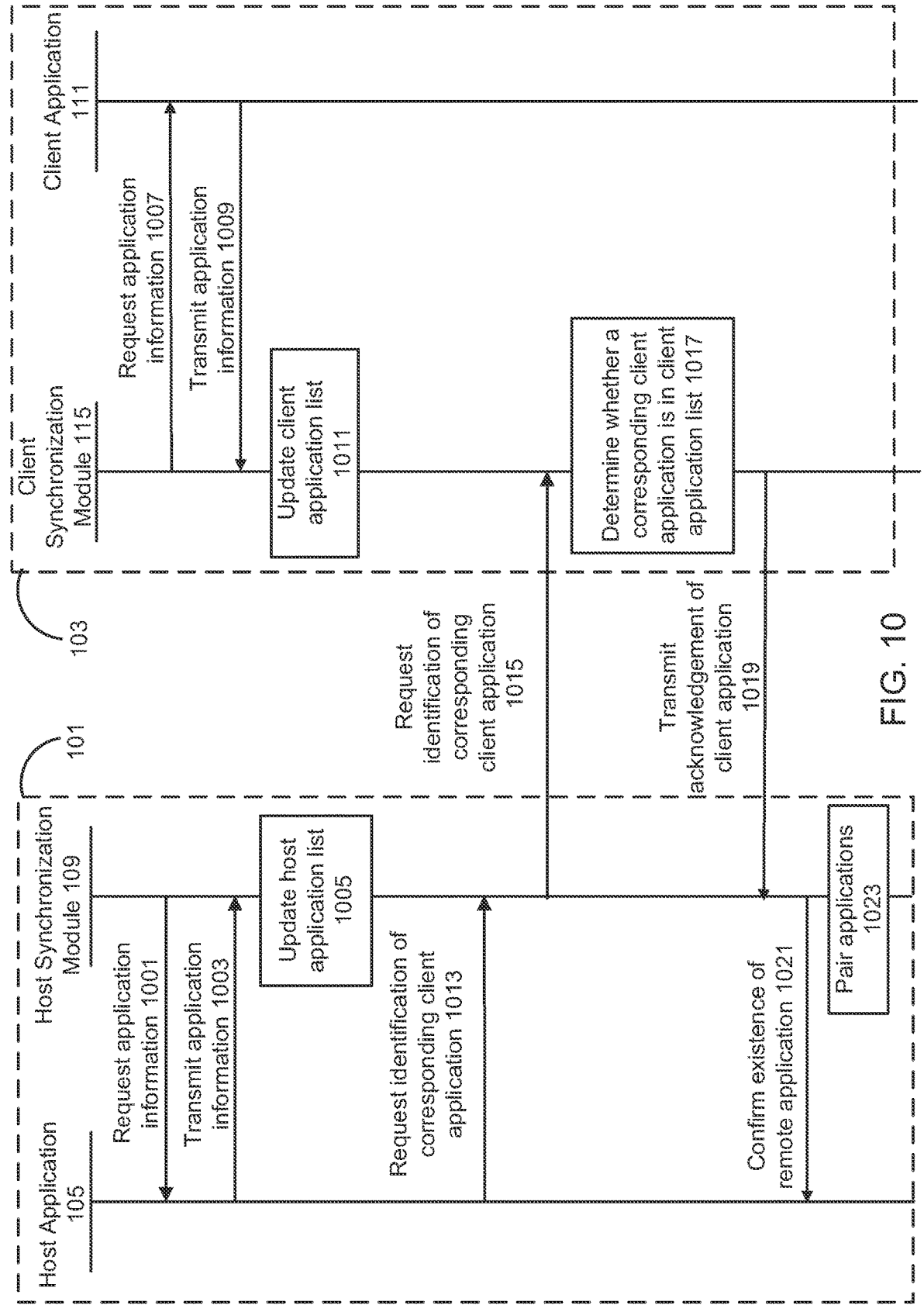
FIG. 10 illustrates an interaction diagram describing application pairing according to one embodiment.

Referring now to FIG. 10, an interaction diagram of the communication process between the host device 101 and the client device 103 to pair applications according to one embodiment. In one embodiment, the host synchronization module 109 and the client synchronization module 115 respectively register host applications 105 on the host device 101 and client applications 111 on the client device 103. Specifically, the host synchronization module 109 requests 1001 application information from a host application 105 (e.g., an email application). The application information may include a unique identifier for the host application 105. The host application 105 transmits 1003 the application information to the host synchronization module 109 which updates 1005 the host application list with the application information for the host application. Accordingly, the host application 105 is registered with the host synchronization module 109.

Similarly, the client synchronization module 115 requests 1007 application information from a client application 111 (e.g., an email application). The client application 111 transmits 1009 the application information of the client application 111 to the client synchronization module 115. The client synchronization module 115 then updates 1011 the client application list with the application information for the client application 111 to complete the application registration with the client synchronization module 115.

To allow UI state synchronization of the host application 105 on the host device 101 and the client application 111 on a paired client device 103, the host application 105 and the client application 111 are paired. After the host application 105 is registered with the host device 101, the host application 105 may request 1013 for the host synchronization module 109 to identify a corresponding client application 1013 on the client device 103. For example, an instance of an email application stored on the host device 101 may request for the host synchronization module 109 to identify the existence of an instance of the corresponding email application on the client device 103 that is paired with the host device 101. Accordingly, the host synchronization module 109 requests 1015 the identification of a corresponding client application 111 that is an instance of the host application 105 on the client device 103. In one embodiment, the request includes the unique identifier for the host application 105.

Responsive to receiving the request, the client synchronization module 115 determines 1017 whether a client application 111 corresponding to the host application 105 is included in the client application list. Particularly, the client synchronization module 1115 determines whether the client application list includes a unique identifier for a client application 111 that matches the unique identifier for the host application 105 that was included in the request. If a matching unique identifier of client application 111 is identified from the client application list, the client synchronization module 115 transmits 1019 an acknowledgment of a registered client application 111 that corresponds to the host application 105 on the host device 101. The host synchronization module 109 confirms 1021 with the host application 105 the existence of a corresponding client application 111 on the client device 103. The host synchronization module 109 may then pair 1023 the host application 105 and its corresponding client application 111. In one embodiment, to pair the applications the host synchronization module 109 updates the information in the host application list to indicate the client application 111 on the client device 103 that corresponds to the host application 105.

UI State Synchronization

Once a host application 105 on a host device 101 is paired with a corresponding client application 111 on a client device 103, the host application 105 can implement UI state synchronization capabilities. Thus, a user may synchronize content currently displayed by the host application 101 which is representative of the current UI state of the host application 105 on the host device 101 to a corresponding client application 111 on the client device once a communication channel 117 is established between the host device 101 and the client device 103. As mentioned previously, to synchronize the UI state, the user provides an instruction to "sync" the host application 105 on the host device 101 and a client application 111 on the client device 103. In one embodiment, the instruction to "sync" is received from the user through a host application on the host device 101. However, the instruction to "sync" may also be received from the user through a client application 111 on the client device 103.

Figure 11:
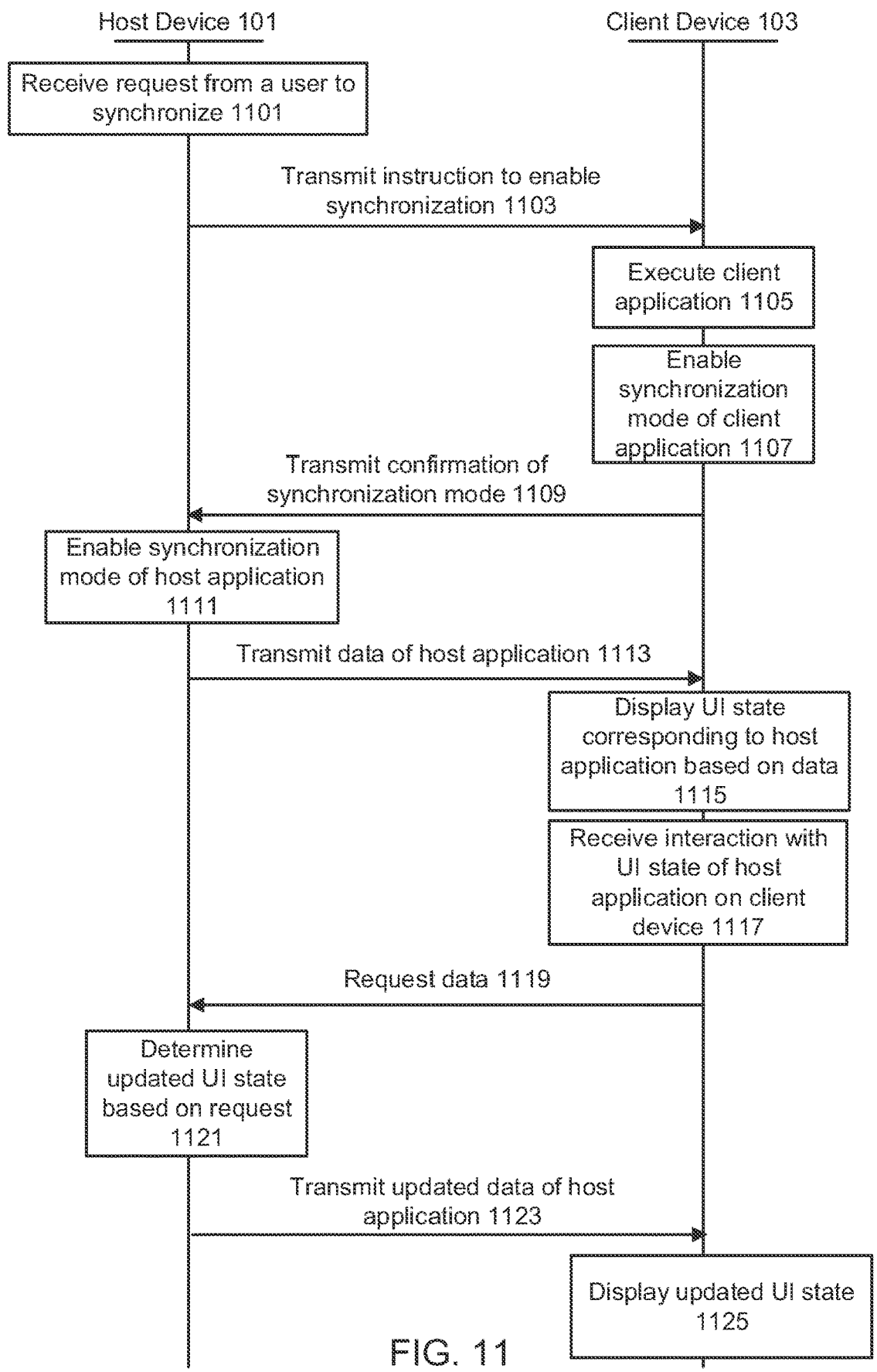
FIG. 11 illustrates an interaction diagram describing synchronization of content states of a host application on a host device with a client application on a client device according to one embodiment.

Referring now to FIG. 11, an interaction diagram describing the communication process between the host device 101 and the client device 103 to synchronize the UI state of a host application is shown according to one embodiment. Note that the communication process between the host device 101 and the client device 103 assumes that the devices are already connected to one another via the communication channel 117.

In one embodiment, the host device 101 receives 1101 a request from a user to synchronize the UI state of a host application 105 with a corresponding client application 111 on the client device 103. For example, the user may select a "sync" button displayed by the host application 105 which causes the host application 105 to instruct the host synchronization module 109 to enable the synchronization mode of the corresponding client application 111 on the client device 103. Alternatively, the request to synchronize may be received on the client device 103. To enable the synchronization mode of the client application 111, the host device 101 transmits 1103 an instruction to the client device 103 via the communication channel 117 (e.g., BLUETOOTH or WiFi) to enable the synchronization mode of the client application 111 corresponding to the host application 105.

In response to the instruction, the client device 103 executes 1105 (i.e., launches) the client application 1105 and enables 1107 the synchronization mode of the client application 111. In one embodiment, during the synchronization mode of the client application 111, the client application 111 no longer displays data local to the client device 103. Rather, the client application 111 displays content data received from the host device 101 that corresponds to the content of the host application 105 to synchronize the UI state of the host application 105 on the host device 101. The client device 103 transmits 1109 a confirmation of the enablement of the synchronization mode of the client application 111 to the host device 101. In response, the host device 101 enables 1111 the synchronization mode of the host application 111.

In one embodiment, during the synchronization mode of the host application 111, the display screen of the host device 101 is turned off to preserve the battery life of the host device 101. Once the host application 101 is in the synchronization mode, the host device 101 transmits 1113 content data (in an encoded format) of the host application 105 that represents that current UI state of the host application via the host synchronization module 109 for display on the client device 103 during the synchronization mode of the host application 111. Thus, the host device 101 transmits the actual encoded-format content of the host application 105 to the client device 103 rather than merely a rendered image of the content.

The client device 103 then displays 1115 the UI state of the client application 111 that corresponds to the UI state of the host application 105 based on the content data received from the host device 101. In one embodiment, the data received by the client device 103 is stored in cache memory of the client device 103 to optimize performance. However, if the data that is transmitted to the client device 103 is above a threshold value (e.g., 10 Mega bytes after compression using BLUETOOTH), the client device 103 may store virtual data that is representative of the UI state of the host device 103 whereas the actual data is stored on the host device 103. Generally, application pairing balances the waiting time to send cached data versus the response time to obtain virtual data from the host device 101 through the targeted wireless communication link 117 to meet targeted user requirements.

While the UI state of the host device 101 is synchronized with the client device 103, the client device 103 receives 1117 interactions with client host application 111 that displays the UI state of the client application 111 that corresponds to the UI state of the host application 105 on the client device 103. As mentioned previously, because a client application 111 that corresponds to the host application 105 is executing on the client device 103, the client application 111 provides the same (or a subset of the) functionality as the host application 105 thereby allowing the user to interact with the encoded content data of the host application 105 directly on the client device 103. For example, consider a host email application that displays a user's emails on the host device 101. If the user synchronizes the host email application and a client email application, the client email application displays content data corresponding to the UI of the host email application on the client device 111. Thus, the layout of the UI that displays the user's emails on the host application 105 is replicated by the client application 111 on the client device 103. Alternatively, the client application may reconfigure the layout of the UI of the host application 105 to optimize the UI for display by the client application 111 on the client device 103. The user may then interact with the content directly on the client device 103 which processes the interactions based on the locally cached content (in encoded format) without requiring any processing by the host device 101.

In one embodiment, the user's interactions received by the client device 103 may require additional data or information from the remote server 121 or from the host application 105 on the host device 101. The client device 103 itself does not directly obtain the data. Rather, the client device 103 requests 1119 data from the host device 101 based on the user's interactions on the client application 111. In one embodiment, the request sent to the host device 101 includes an indication of the user's interaction and the object of the client application 105 that was interacted with by the user. Thus, the client device 103 relies upon the host device 101 to retrieve data in response to user interactions with the client application 111. For example, if the user requests to view an email attachment on the client email application, the client device 103 requests from the host device 101 the data corresponding to the email attachment that the user wants to view.

Upon receipt of the request from the client device 103, the host device 101 determines the content data corresponding to an updated UI state of the host application 105 based on the requested data. In one embodiment, to determine the updated UI state, the host application 105 identifies the interaction and object that is included in the request and obtains the associated content data. In one embodiment, the associated data may be retrieved from another party such as the remote server 121. In the email example, the host application 105 may identify the interaction as a selection (i.e., the interaction) of an email attachment (i.e., the object). The email application may communicate with a remote email server via the network 119 to obtain the content of the selected email attachment in order to determine content data associated with a UI state of the host application 105 that provides the content of the email attachment (e.g., a video, an image, a music file, a word document, etc). The host device 101 transmits 1123 the updated content data of the host application 105 that is representative of the updated UI state of the host application 105 to the client device 103. The client device 103 then displays 1125 the updated UI state of the client application 111 that corresponds to the updated UI state of the host application 111 based on the updated content data received from the host device. For example, the client device 103 may display the content of the email attachment selected by the user on the client device 103.

In one embodiment, the user may elect to disable or "unsync" the host device 101 and client device 103. For example, the user may select the "unsync" button on the client device 103. Alternatively, the user may select an "unsync" button on the host device 101. The client synchronization module 115 transmits a request to the host device 101 via the communication channel 117 to disable the synchronization mode of the host application 105. The host synchronization module 109 receives the request and instructs the host application 105 to disable the synchronization mode of the host application 105. One the host application 105 disables the synchronization mode, the host synchronization module 109 transmits to the client device 103 via the communication channel 117 a confirmation that the synchronization mode of the host application 105 is disabled. The client synchronization module 115 receives the confirmation and disables the synchronization mode of the client application 111. Once the host application 105 and the client application 111 have disabled the synchronization mode, they revert back to respectively displaying data local to the host device 101 and the client device 103.

Communication Channel Switching

In one embodiment, the host device 101 and the client device 103 may switch the type of communication channel 117 being used to communicate information between the host device 101 and the client device 103. The switch between types of communication channels may be changed manually through user input to switch from a first type of communication channel to a second type of communication channel. For example, the user may manually request to switch from using BLUETOOH to WiFi if a faster data connection is required. Alternatively, the switch between types of communication channels may be automatically performed by the host synchronization module 109.

In one embodiment, the host synchronization module 109 may determine that the current type of communication channel 117 is transferring data between the host device 101 and the client device 103 below a threshold level which is impacting user experience. Accordingly, the host synchronization module 109 may automatically switch from a first type of communication channel to a second type of communication channel that provides faster data connectivity. For example, the host synchronization module 109 may switch between using BLUETOOTH to WiFi to connect the host device 101 and the client device 103.

In another embodiment, the host synchronization module 109 may determine that the battery life of at least one the host device 101 and the client device 103 has reached a threshold level indicative of low battery power. Accordingly, the host synchronization module 109 may automatically switch from a first type of communication channel to a second type of communication channel which consumes less battery power. For example, the host synchronization module 109 may switch from using WiFi to BLUETOOTH to connect the host device 101 and the client device 103.

In one embodiment, to switch from a first type of communication channel that is being used to synchronize the UI state of the host device 101 and a client device 103 to a second type of communication channel, the host synchronization module 109 establishes a connection with the client device 103 using the second type of communication channel. Furthermore, the host synchronization module 109 instructs the client device 103 to establish a connection with the host device 101 using the second type of communication channel. Once the client synchronization module 115 of the client device 103 has established the connection with the host device 101 using the second type of communication channel, the host synchronization module 109 receives a request from the client synchronization module 115 to disable the first type of communication channel. The host synchronization module 109 disables the first type of communication channel based on the request. Data transferred between the host device 101 and the client device 103 is now transferred via the second type of communication channel. Because the first type of communication channel is disabled after the second type of communication channel is established, the UI state synchronization between the host device 101 and the client device 103 is maintained (i.e., not interrupted). This allows for a seamless transition between the different types of communication channels without diminishing the user experience.

Remote Notification

In one embodiment, the host synchronization module 109 may provide notifications to a client device 103 of updated content available on a host application 105 otherwise known as remote notifications across devices. Remote notification allows a user to receive notifications on the client device 103 of events that occur on the host device 101 such as the receipt of a new e-mail, receipt of a text message, a subscription arrival, and/or an incoming phone call on the host device 101. Remote notification allows for a user of the client device 103 to be notified of these events at the host device 101 without needing to switch focus to the host device 101 to process the events. Rather, the user may be notified of the events on the client device 103 and the user uses the client device 103 to process the events remotely through the synchronized user interface of the corresponding host application 105. For example, if a new email is received at a host application 105 of the host device 111, (e.g., the ANDROID operating system provides a function to allow an email application to run in the background as a service to periodically check for new email arrivals at the email application), the host email application via the host synchronization module 109 may notify the client device 103 to display an indication that a new email has been received by the host email application. For example, the client device 103 may display an icon of an envelope on the display screen of the client device 103. The notification may be displayed in a notification area of the client device 103 or a prompt may be displayed to the user that includes the notification.

Figure 12:
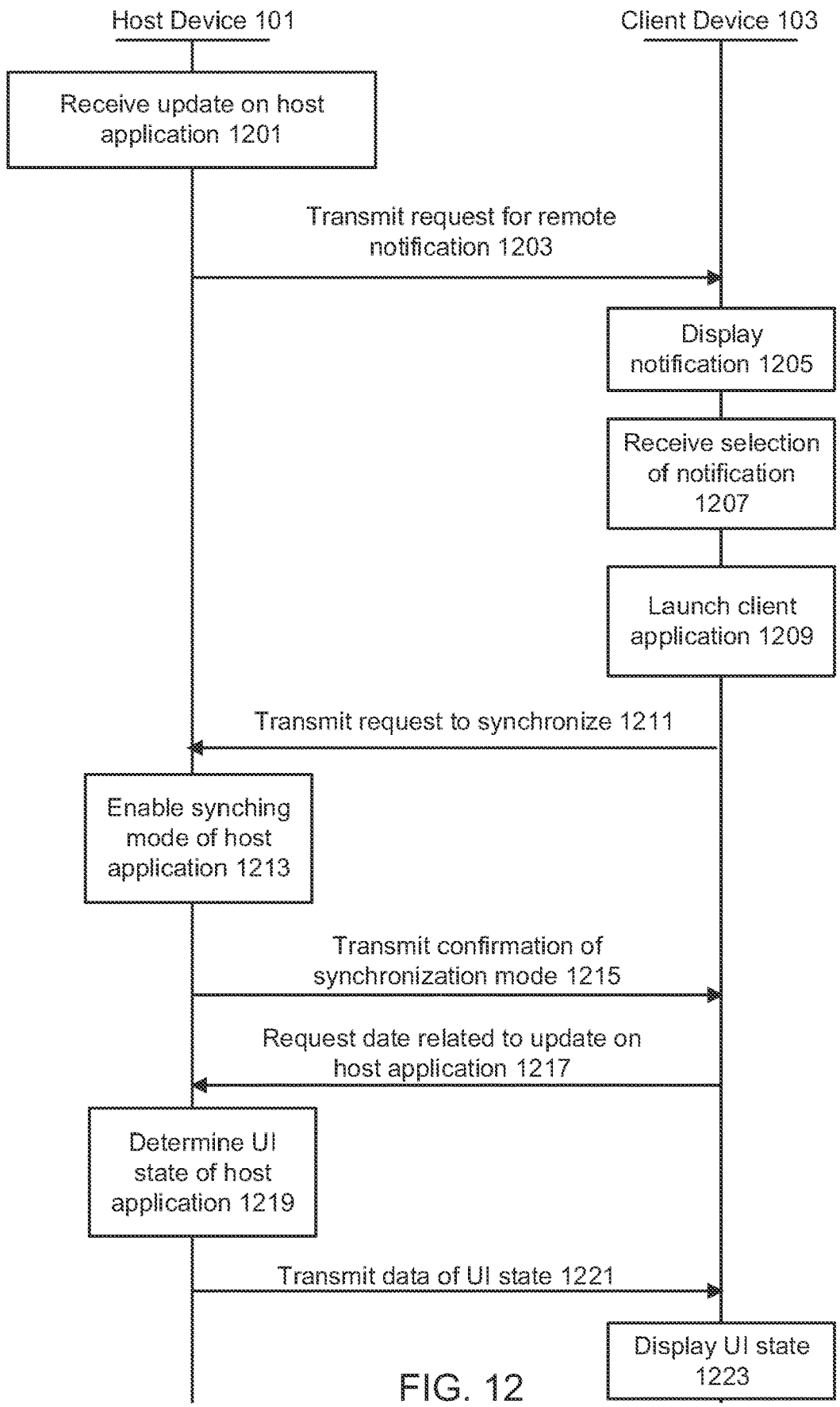
FIG. 12 illustrates an interaction diagram describing providing remote notifications of a host application on a host device to a client device according to one embodiment.

Referring now to FIG. 12, an interaction diagram illustrating the communication process between the host device 101 and the client device 103 for remote notification is shown according to one embodiment. Note that the communication process shown in FIG. 12 assumes that a host application 105 and a corresponding client application 111 have been respectively installed on the host device 101 and the client device 103. As a notification may arrive anytime when a user consumes content on the client device 103, a communication channel 117 such as BLUETOOTH is established to link the client device 103 and the host device 101 so that the user can monitor the notification events for a long duration of time without draining battery power of the client device 103 and host device 101.

In one embodiment, the host device 101 receives 1201 an update of certain content on a host application. For example, a host email application on the host device 101 may receive a new email from an email server connected to the host device 101. In another embodiment, a new photo may captured by the host device 101. In yet another example, a new version of the host application may be received. If the host device 101 and the client device 103 are not connected via a communication channel 117, the host device 101 and the client device 103 connect to one another via the communication channel 117 as previously described above. Once connected, the host device transmits 1203 a request for remote notification to the client device 103 via the communication channel 117. In one embodiment, requesting the remote notification comprises the host application 105 sending an instruction to the host synchronization module 109 to send a notification to the client device 103 that the host application 105 has received an update of the application's content. The client synchronization module 115 receives the request from the host device 101 and instructs the client device 103 to display 1205 the notification received from the host device 101. The notification displayed on the client device 103 indicates updated content is available to the user.

In one embodiment, the type of notification that is displayed is based on the host application 105 that has updated content for the user. For example, an envelope icon is indicative that a new email was received by a host email application. Alternatively, a newspaper icon may indicate that a new news article was received by a host newspaper application or a photo icon may indicate that a new digital photograph was received by a host photo application. Another example is a text message icon that indicates that an instant message was received by a host text messaging application on the host device 101. Finally, a phone dialer icon displayed on the client device 103 may indicate an incoming phone call is being received by a host phone dialer application on the host device 101. The phone dialer icon displayed on the client device 103 indicates that user can view the related caller information and take notes from the client device 103. The embodiments described herein allows the user to handle phone events by running a corresponding application at the client device 103 with a synchronized user interface. Note that any type of icon may be used to designate updated content available from an associated application.

The client device 103 receives 1207 a selection of the notification on the client device 103. For example, the user may click or tap on an email icon displayed on a notification area of the client device 103. After the selection is received at the client device 103, the client device 103 launches 1209 the client application 103. That is, the client synchronization module 115 sends an instruction to the client synchronization plug-in 113 to start the client application 111 that corresponds to the host application 105 that sent the notification to the client device 103. In one embodiment, when the client application 111 is launched, the synchronization mode of the client application 111 is enabled.

The client device 103 then transmits 1211 a request to the host device 101 to synchronize with the client device 103. Upon receipt of the request to synchronize, the host device 101 enables 1213 the synchronization mode of the host application 105 and transmits 1215 a confirmation of the synchronization mode of the host application 105 to the client device 103. In response, the client device 103 transmits a request 1217 for data related to the update on the host application 105 to the host device 101. The host device 101 determines 1219 the UI state of the host application 105. That is, the host application 105 generates content data corresponding to its UI state that includes the updated content which is communicated to the host synchronization module 109 via the host synchronization plug-in 107. For example, a host email application may generate a UI of a list of emails that includes a newly received email at the host email application.

The host device 101 then transmits 1221 content data of the UI state of the host application 105 to the client device. Continuing the email application example, the host device 101 may transmit content data corresponding to the list of emails that includes the newly received email at the host email application. The client device 103 displays 1223 the UI state of the client application 111 based on the received content data from the host device 101. As mentioned previously, the user may interact with the UI state of the client application 111 directly on the client device 103. In one embodiment, a remote notification is not sent to the client device 103 if the corresponding client application 111 is already running on the client device 103. For example, a client email application may show the newly received mail item in BOLD font type without the need to send another notification rather than show an icon indicative of remote notification. In operating systems that do not support running an application as a service in the background, other similar techniques could be used without derivation of the embodiments herein. In another embodiment, the client application 111 could be opened as a sub-window on the client device 103 without disrupting the content consumption window on the display screen of the client device 103. All these cases can improve user productivity and are representative of cross-device notification and execution between host and client devices Summary The foregoing description of the embodiments above has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable storage medium containing computer program code, which can be executed by a computer processor for performing any or all of the steps, operations, or processes described.

The embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The embodiments may also relate to a product that is produced by a computing process described herein. Such a product may comprise information resulting from a computing process, where the information is stored on a non-transitory computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments described above be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method for synchronizing a user interface (UI) state of content of a host application on a host device with a client application on a paired client device that is paired to the host device, the method comprising:
  receiving an event at the host application;
  synchronizing the UI state of the content of the host application by:
    determining content data that is related to at least a portion of the UI state of content displayed by the host application,
    identifying the client application, which corresponds to the host application, by communicating a request to the paired client device from the host device and receiving a response to the request that identifies the client application; and
  communicating, to the client device, the content data that is related to the at least the portion of UI state of the content of the host application, where the host application is configured to show a distinct but synchronized UI to support continuing operation of the host application at the client device;

wherein the client application is configured to display a UI state of content of the client application, based on the related content data of the at least the portion of the UI state of the content of the host application, wherein the client application, in a first state that is independent of a UI update to the host application, processes a first client user input and updates the client UI, while the related content data of the at least a portion of the UI state of the content communicated from the host application is stored in the client application without changing the first state to maintain the synchronization, and wherein the client application, in a second state, resumes executing UI synchronization with the host application responding to a second client user input of the second state that causes one or more client UI updates and a change of the related content data of the at least a portion of the UI state of content from the host application, and wherein the host device is connected with the paired client device via a wireless link.

2. The computer-implemented method of claim 1, wherein the client application is configured to navigate and update the user interface at the client device through the first client user input of the first state independent of the UI update of the host application for content navigation.

3. The computer-implemented method of claim 2, wherein, while the related content data of the at least a portion of the UI state of the content communicated from the host application is unchanged, navigation activities of the client application that caused a client UI update comprise at least one of zooming, scrolling and changing orientation.

4. The computer-implemented method of claim 1, wherein the first client user input of the first state is a portion of a string of text ended with a line end indicator, wherein the client application can capture the string of text characters typed in, and wherein the string of text is handled by the client application independent of the UI update of the host application.

5. The computer-implemented method of claim 4, wherein the client application comprises at least one of a TEXT message application, a mail application, and a browser application.

6. The computer-implemented method of claim 1, wherein the host application is configured to process user input at the host device as well as process the second client user input through the corresponding request sent from the client application.

7. The computer-implemented method of claim 1, wherein the client application comprises at least one of a photo application and a browser application.

8. The computer-implemented method of claim 7, wherein the client application comprises the photo application, wherein the UI synchronization is performed with respect to photos, wherein the content data comprises a first JPEG (Joint Photographic Experts Group) file that is related to a photo image UI displayed by the photo application which is paired, wherein the first client input of the first state is a zooming command of the client UI image based on the first JPEG file, and wherein the second client input of the second state for the client photo application is a command to show a new photo image, which has updated content data of a second JPEG file related to the new photo image.

9. A system for synchronizing a user interface (UI) state of content of a host application on a host device with a client application on a paired client device that is paired to the host device, the system comprising:

memory with instructions encoded thereon; and one or more processors that, when executing the instructions, are caused to perform operations comprising:

receiving an event at the host application;

synchronizing the UI state of the content of the host application by:

determining content data that is related to at least a portion of the UI state of content displayed by the host application, identifying the client application, which corresponds to the host application, by communicating a request to the paired client device from the host device and receiving a response to the request that identifies the client application; and communicating, to the client device, the content data that is related to the at least the portion of UI state of the content of the host application, where the host application is configured to show a distinct but synchronized UI to support continuing operation of the host application at the client device;

wherein the client application is configured to display a UI state of content of the client application, based on the related content data of the at least the portion of the UI state of the content of the host application, wherein the client application, in a first state that is independent of a UI update to the host application, processes a first client user input and updates the client UI, while the related content data of the at least a portion of the UI state of the content communicated from the host application is stored in the client application without changing the first state to maintain the synchronization, and wherein the client application, in a second state, resumes executing UI synchronization with the host application responding to a second client user input of the second state that causes one or more client UI updates and a change of the related content data of the at least a portion of the UI state of content from the host application, and wherein the host device is connected with the paired client device via a wireless link.

10. The system of claim 9, wherein the client application is configured to navigate and update the user interface at the client device through the first client user input of the first state independent of the UI update of the host application for content navigation.

11. The system of claim 10, wherein, while the related content data of the at least a portion of the UI state of the content communicated from the host application is unchanged, navigation activities of the client application that caused a client UI update comprise at least one of zooming, scrolling and changing orientation.

12. The system of claim 10, wherein the first client user input of the first state is a portion of a string of text ended with a line end indicator, wherein the client application can capture the string of text characters typed in, and wherein the string of text is handled by the client application independent of the UI update of the host application.

13. The system of claim 12, wherein the client application comprises at least one of a TEXT message application, a mail application, and a browser application.

14. The system of claim 9, wherein the host application is configured to process user input at the host device as well as process the second client user input through the corresponding request sent from the client application.

15. The system of claim 9, wherein the client application comprises at least one of a photo application and a browser application.

16. The system of claim 15, wherein the client application comprises the photo application, wherein the UI synchronization is performed with respect to photos, wherein the content data comprises first JPEG (Joint Photographic Experts Group) file that is related to a photo image UI displayed by the photo application which is paired,
    wherein the first client input of the first state is a zooming command of the client UI image based on the first JPEG file, and
    wherein the second client input of the second state for the client photo application is a command to show a new photo image, which has updated content data of a second JPEG file related to the new photo image.

\* \* \* \* \*